United States Patent [19]

Goans

[11] Patent Number: 4,462,301

[45] Date of Patent: Jul. 31, 1984

[54] BOURDON TUBE ACTUATOR

[75] Inventor: Kip B. Goans, Harvey, La.

[73] Assignee: Baker CAC, Inc., Belle Chasse, La.

[21] Appl. No.: 318,165

[22] Filed: Nov. 4, 1981

[51] Int. Cl.³ .................. F01B 19/04; G01L 7/04; F16K 17/36

[52] U.S. Cl. .................................. 92/48; 92/92; 92/95; 92/161; 73/736; 73/742; 137/81.1

[58] Field of Search .............. 92/48, 89, 91, 92, 94, 92/95, 928, 161; 73/736, 740, 741, 742; 251/58, 61; 137/81.1

[56] References Cited

U.S. PATENT DOCUMENTS

| | | | |
|---|---|---|---|
| 2,376,634 | 5/1945 | Tellkamp | 92/91 |
| 3,067,616 | 12/1962 | Silver | 73/742 |
| 3,188,419 | 6/1965 | Barksdale | 700/81.8 |
| 3,315,606 | 4/1967 | Piros | 92/48 |
| 3,741,015 | 6/1973 | Moss, Jr. et al. | 73/742 |
| 3,774,452 | 11/1973 | Tullos et al. | 73/742 |
| 4,108,050 | 8/1978 | Paynter | 92/48 |
| 4,323,741 | 4/1982 | Krohn | 92/91 |

Primary Examiner—Robert E. Garrett
Assistant Examiner—Richard S. Meyer
Attorney, Agent, or Firm—Norvell & Associates

[57] ABSTRACT

A Bourdon tube apparatus is provided for monitoring the pressure of a fluid pressure source. The output of the Bourdon tube is translated into a curvilinear motion which is transmitted to a linearly movable actuator valve or indicator. To enhance the force output linear response or linear output of the Bourdon tube actuator, an abutment block is provided which contacts one or more turns of the Bourdon tube adjacent its closed end to prevent expansion movement of the Bourdon tube in a direction opposite to the desired linear output movement. The Bourdon tube is mounted for calibrational purposes by having its open end connected by a flexible pipe to a support post which is rotationally mounted for movement about its longitudinal axis and defines a fluid conduit connection between the pressure source being monitored and the open end of the Bourdon tube. Angular rotation of the support post will effect the stressing or unstressing of the turns of the Bourdon tube to permit calibration of the linear output movement to the fluid pressure being monitored.

5 Claims, 3 Drawing Figures

BOURDON TUBE ACTUATOR

BACKGROUND OF THE INVENTION

1. Field of the Invention

This invention relates to an apparatus for monitoring a fluid pressure through the utilization of one or more Bourdon tubes having an open end in fluid communication with a fluid pressure source to be monitored and a closed end operatively connected to a linearly shiftable actuator, such as the stem of a pilot valve.

2. Description of the Prior Art

Bourdon tubes have long been known in the prior art and utilized for the monitoring of fluid pressure. See, for example, the disclosures of U.S. Pat. Nos. 3,126,519, 3,145,359, 3,147,623, 3,188,419 and 3,204,464. In the majority of prior art applications of Bourdon tubes, the open end of the tube is connected to a fluid pressure source to be monitored and the closed end of the tube is employed to shift an actuating or indicating arm in a circular path, for example, the arm of an electric potentiometer which thus generated an electrical signal proportional to the changes in the fluid pressure being monitored. As is well known, the Bourdon tube depends to a high degree for its accuracy in detecting changes in fluid pressure to the unrestrained mounting of the turns of the tube. Every Bourdon tube responds to a change in applied fluid pressure by either a radial expansion or contraction of the turns of the tube which results in the closed end of the tube moving in a generally circumferential path which can be readily translated into a rotational or linear movement of an actuator or an indicator.

When it is desired to employ a Bourdon tube to effect the shifting of a linearly shiftable actuator, or indicator, the mechanisms heretofore disclosed in the prior art have not provided the capability to increase the force output of the closed end without decreasing the total available movement of the tube tip, particularly not in conjunction with the ability to adjust the stressing of the Bourdon tube for calibration purposes. Common ways to obtain increased force are to use fewer number of coils in the tube or a mechanical lever. Both ways reduce the movement of the tip for a decrease or increase in the pressure being sensed.

SUMMARY OF THE INVENTION

The present invention provides a Bourdon tube actuator for producing a linear movement of an actuator stem or an indicator in response to a change in fluid pressure of a fluid pressure source being monitored. The closed end of the Bourdon tube is connected to a radial arm having an inner end overlying the longitudinal axis of the tube, and an output post is secured to such inner end and normally lies in substantially coaxial relationship to the axis of the Bourdon tube. A leaf spring is attached to the support post in radial relationship, and the movement of the support post, produced by pressure change expansion or contraction of the Bourdon tube, is translated into a linear motion of an actuator through the connection of the outer end of the generally radially disposed leaf spring to a linearly shiftable actuator or indicator.

Additionally, this invention provides a convenient means for calibrating the output movements of the Bourdon tube in reference to the pressure to be monitored. The open end of the Bourdon tube is supported by and connected to a support post which is journalled for rotation about a vertical axis. A fluid conduit passes through the support post, and a short length of relatively flexible pipe provides the only connection between the support post and the open end of the Bourdon tube, as well as the only support for the Bourdon tube. Rotational adjustment of the support post about its longitudinal axis will then effect either a contraction or expansion of the Bourdon tube and thus achieve a calibration of the tube to produce a desired response at a selected level of the fluid pressure being monitored.

Additonally, this invention provides a radially adjustable abutment which is mounted to contact one or more turns of the Bourdon tube adjacent to the closed end of such tube and maintain a slight pressure on the contacted turn or turns. This pressure results in a pronounced increase of shifting force of the output post of the Bourdon tube through a very short distance in response to pressure change, which is most effective in imparting the desired motion to a linearly shiftable actuator or indicator.

In accordance with a preferred modification of this invention, two such Bourdon tube actuators are employed in side by side relationship and a pair of leaf springs respectively connect the output posts of two Bourdon tube applicators to a common linearly movable actuator. Thus, the one Bourdon tube may be employed to shift the actuator in a direction to provide a signal or close a valve upon an increase in pressure of the fluid pressure source being monitored, while the second Bourdon tube may be employed to produce a linear shift of the actuator in the same direction to produce a signal or the closing of a valve in response to a decrease in pressure of the fluid pressure source being monitored below a desired level. The reliability and accuracy of response of the twin Bourdon tube apparatus embodying this invention to departures in pressure of a fluid pressure source being monitored in either direction from a desired pressure range is unexcelled in the prior art.

DESCRIPTION OF THE PREFERRED EMBODIMENTS

Figures 1, 3:
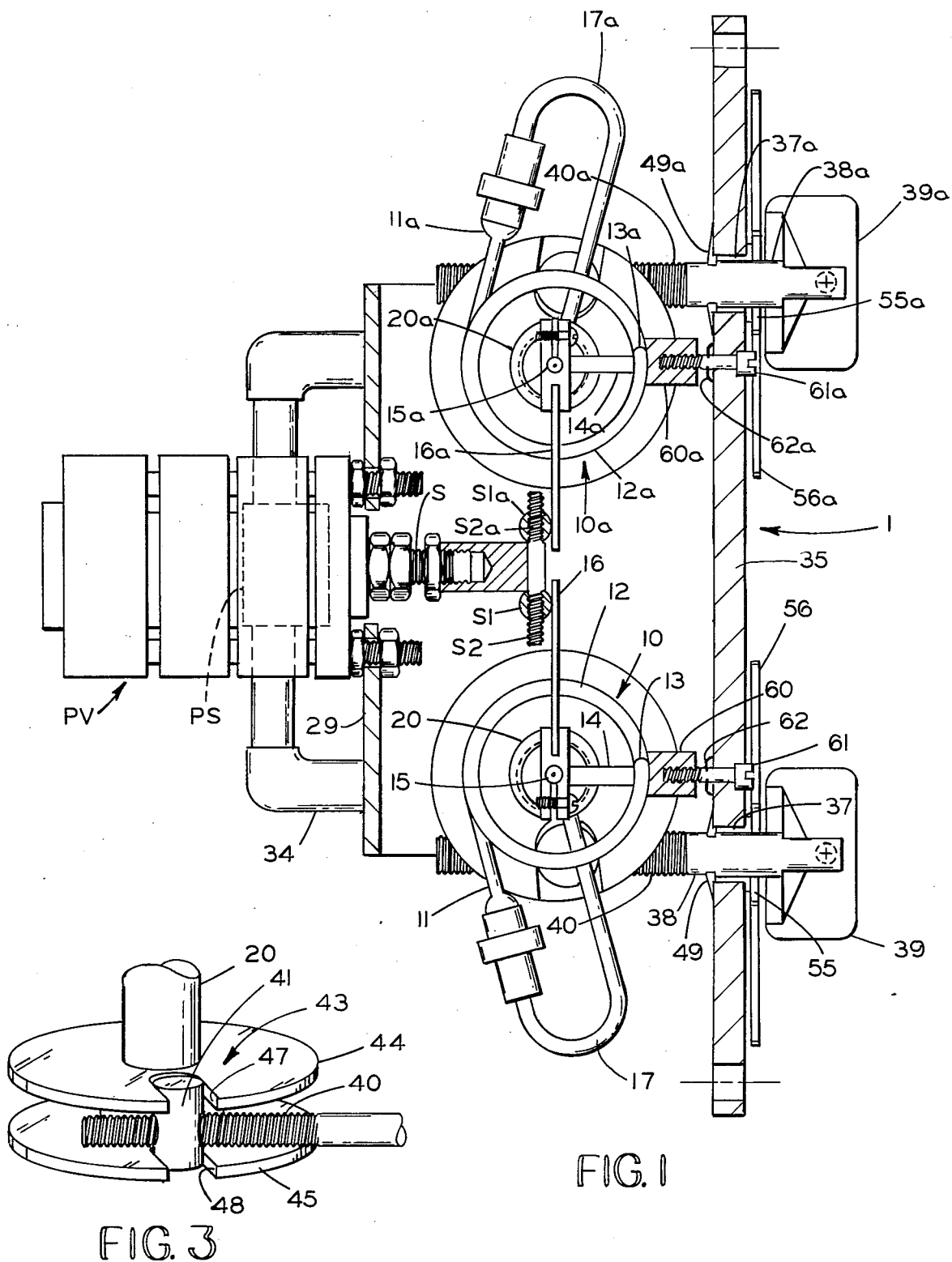
FIG. 1 is a plan view, with portions in section, of a fluid pressure monitoring apparatus embodying two Bourdon tube monitoring devices embodying this invention.
FIG. 3 is a perspective view of the position adjusting mechanism provided for the calibration of each of the Bourdon tubes involved in the apparatus of FIG. 1.

Referring to the drawings, there is shown an apparatus 1 for monitoring the fluid pressure of a pressure source PS employing two Bourdon tube actuators 10 and 10a embodying this invention. Each actuator 10 and 10a is substantially identical and incorporates the unique features of this invention; however, the employment of two such actuators permits the monitoring of the fluid pressure source PS over a selected range of fluid pressures. The departure of the monitored pressure in either direction from the selected range results in a linear shifting of an actuator which, in this instance, comprises the stem S of a pilot valve PV. The pilot valve PV functions upon linear movement of the actuating stem S in a direction toward the left, as viewed in FIG. 1, to produce a control or an indicating action whenever the pressure of the fluid pressure source PS being monitored rises above, or falls below the preselected range of pressure. Those skilled in the art will recognize that many types of linearly shiftable actuators or indicators could be employed instead of the specific pilot valve PV, hence the term linearly shiftable actuator hereinafter employed should be understood to include any type of indicator or actuator requiring a linear movement to cause it to perform its desired function.

For simplicity of description, only one of the Bourdon tube actuators 10 and 10a will be described and it should be understood that the suffix "a" applied to all components of the second actuator 10a indicates a substantially identical part to that employed on the first Bourdon tube actuator 10.

The Bourdon tube actuator 10 includes an open end 11 which is connected through a plurality of helical turns 12 to a closed end 13. The closed end 13 is in turn rigidly connected to a radially disposed arm 14, having an inner end disposed in substantially overlying relationship to the axis of the helical turns 12. Arm 14 in turn rigidly supports a pivot post 15 which, in the inactive position of the Bourdon tube 10 is disposed in substantial alignment with the longitudinal axis of the helical turns 12.

A generally radially disposed leaf spring 16 has its one end suitably rigidly secured to pivot post 15 and its other end disposed in abutting contact with a spherical nut S1 provided on a threaded radial projection S2 mounted on the actuating stem S of the pilot valve PV. Thus, any counterclockwise rotational displacements of pivot post 15 produced by circumferential contraction of the helical turns 12 of Bourdon tube 10 will impose a force on the nut S1 which will tend to linearly move the actuator stem S in a direction to cause the pilot valve PV to function, which, in the illustrated example, is to the left. Additionally, any linear movement of the pivot post 15, produced in a manner hereinafter described, which is parallel to, and in the same direction as the desired linear movement of the actuator stem S will likewise effect a shifting of the actuator stem S in the desired direction to operate pilot valve PV.

Figure 2:
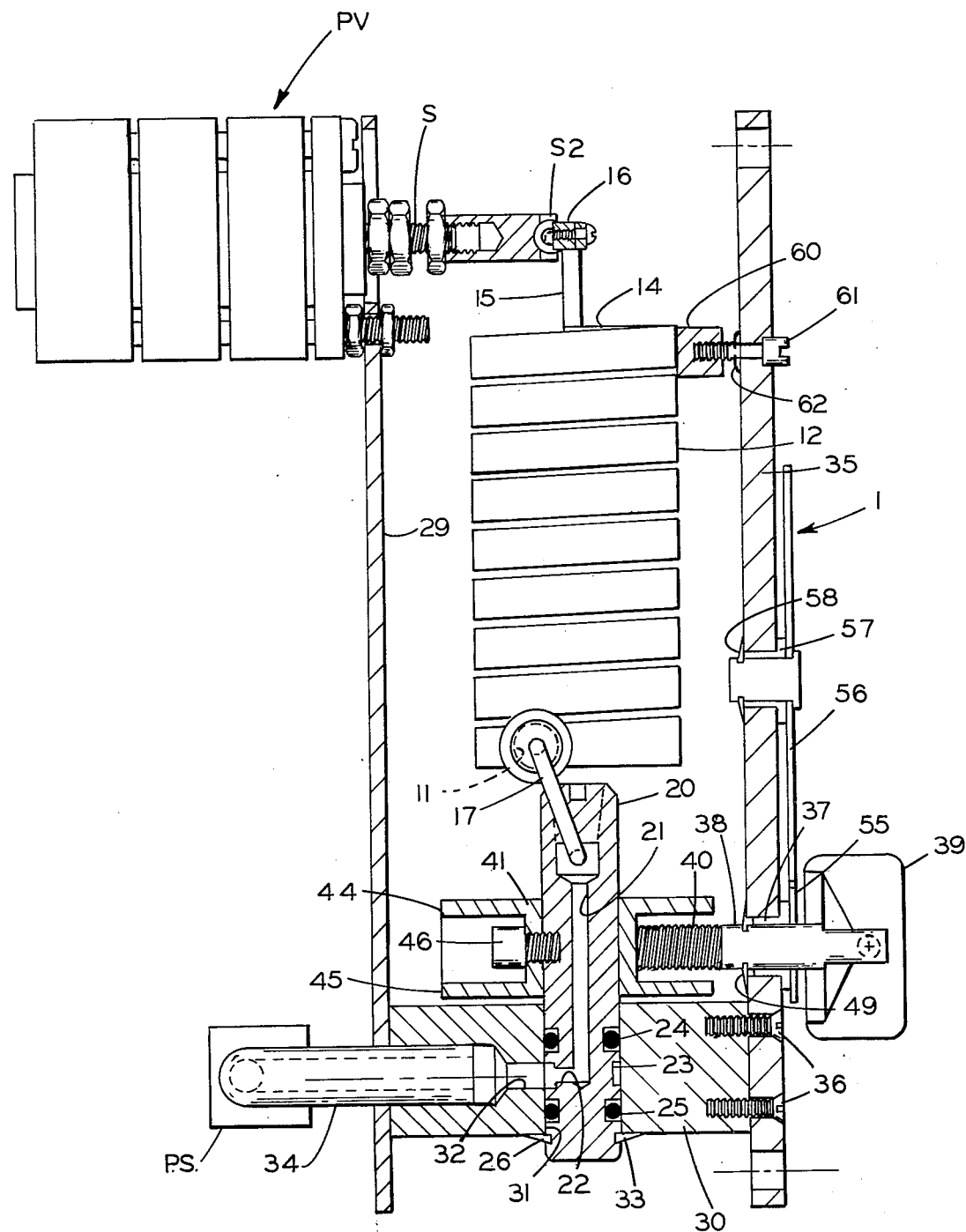
FIG. 2 is a schematic elevational view with portions in section, of the apparatus of FIG. 1.

It is desirable that the Bourdon tube 10 be supported in manner that does not interfere with the fluid pressure induced contraction or expansion of the helical turns 12. In accordance with this invention, the open end 11 of the Bourdon tube 10 is connected by a relatively short, looped length of semi-flexible pipe or tubing 17 to a generally cylindrical support post 20. Support post 20 is journalled for rotation about its longitudinal axis in a vertical bore 31 (FIG. 2) provided in a generally horizontal block element 30.

The support post 20 is axially fixed relative to the horizontal block 30 by C-spring washer 33 which is engaged between an appropriate slot 26 provided in the bottom end of the support post and the bottom face of the horizontal block 30.

A horizontally disposed fluid passage 32 is provided in block element 30 which communicates with bore 31. Support post 20 is provided with an axially extending fluid passage 21 terminating at its lower end in a radial passage 22 which communicates with an annular peripheral groove 23. Groove 23 is in continuous fluid communication with the fluid passage 32. An appropriate pipe 34 connects the fluid passage 32 to the fluid pressure source PS to be monitored. A pair of O-ring seals 24 and 25 are mounted in surrounding relationship to support post 20 above and below the annular recess 23, thus preventing any fluid leakage while maintaining the open inlet end 11 of Bourdon tube 10 in constant fluid communication with the pressure source PS, through pipe 34, regardless of the angular position of the support post 20 about its longitudinal axis.

A vertically disposed panel 35 is provided which is suitably secured to the horizontal block 30 by screws 36. Vertical panel 35 is further provided with a horizontal aperture which receives a bushing 37 which journals an adjustment shaft 38 having a manually engagable knob 39 suitably secured to its projecting outer end. The inner end of shaft 38 is externally threaded as indicated at 40, and these threads cooperate with the internal threads provided in a central transverse bore provided in a vertical pin 41 (FIG. 3).

Pin 41 in turn is positioned in a collar 43 having vertically spaced flange portions 44 and 45. Collar 43 is secured to the support post 20 by a set screw 46. Flanges 44 and 45 are respectively provided with vertically aligned recesses 47 and 48 which receive the top and bottom ends of the pin 41 (FIG. 3). A C-spring washer 49 anchors the shaft 38 in a fixed axial position relative to the vertical panel 35 so that rotation of shaft 38 by knob 39 effects the movement of pin 41 toward and away from the vertical panel 35, and thus effects an angular shifting of the support post 20 about its vertical longitudinal axis.

This angular adjustment is utilized to calibrate the Bourdon tube 10 to correspond to one of the pressure limits of the pressure source PS at which a response of pilot valve PV is desired. Rotation of the support post 20 in a direction to unwind the helical turns 12 of the Bourdon tube 10 will increase the fluid pressure at which the desired response of the pilot valve PV will be produced. If support post 20 is rotated in a direction to tighten the helical turns 12 of the Bourdon tube 12, obviously a lower fluid pressure will be required to effect sufficient expansion of the turns 12 of the Bourdon tube 10 to offset the calibration bias and the response pressure of Bourdon tube 10 will be raised.

The pilot valve PV is appropriately mounted to the top end of a second vertical panel 29 suitably secured to the opposite side of the horizontal block 30.

The second Bourdon tube 10a is mounted on block 30 in vertical, parallel relationship to the first Bourdon tube 10 and on the opposite side of the actuator stem S. All components of the second Bourdon tube 10 are identical to the aforedescribed components of the first Bourdon tube 10.

Because the second Bourdon tube 10a is disposed on the opposite side of the linerally movable actuator stem S, expansion movement of the second Bourdon tube 10a will produce a linear movement of the actuating stem S in the direction to cause the actuation of the pilot valve PV. Expansion movement of the Bourdon tube 10a will result in a clockwise movement of the leaf spring 16a to produce the shifting of the pilot valve actuating stem S to the left to effect the operation of the pilot valve PV.

It is therefore apparent that the two Bourdon tubes 10 and 10a, arranged in the aforedescribed manner relative to the linearly shiftable actuating stem S of the pilot valve PV, will produce an operation of that pilot valve PV when the fluid pressure of the source PS being monitored exceeds a desired limit, through the expansion of the second Bourdon tube unit 10a, or when the pressure of the source PS being monitored drops below a desired value, through the contraction of the first Bourdon tube unit 10. The second Bourdon tube unit 10a may be calibrated with respect to the desired fluid pressure response point through manipulation of the manually adjustable shaft 38a.

If it is desired to provide a visual indication of the fluid pressure setting of the Bourdon tube 10, a gear 55 can be keyed to the shaft 38 and engaged with the toothed periphery of an indicating dial 56 which is suitably journalled in the vertical panel 35 by a hub 57 (FIG. 2) which is retained therein by a C-spring washer 58. Appropriate indications (not shown) may be provided on the face of the large dial 56 to cooperate with a stationary marking (not shown) on the vertical panel 35 to provide an indication of the pressure setting of the Bourdon tube 10. A similar indicating dial 56a may be provided for the second Bourdon tube unit 10a.

The apparatus heretofore described will produce a satisfactory linear movement of an actuator or indicator in response to a change in fluid pressure of a fluid pressure source being monitored. Since, however, the actuator is shiftable only by a linear movement, the magnitude of the response of the Bourdon tube 10 may be significantly increased through the provision of a low friction abutment 60 which engages the outer walls of one or more of the upper turns 12 of the Bourdon tube 10. The radial position of abutment 60 may be determined by an adjusting bolt 61 which traverses an appropriate horizontal aperture in the vertical panel 35 and is retained against axial movement by spring washer 62. The end of the shaft of the bolt 61 threadably cooperates with the abutment block 60 so that the radial position of said abutment block with respect to the axis of the helical turns 12 may be readily adjusted.

As best shown in FIG. 1, the abutment block 60a is positioned to contact the upper turns of helical turns 12 at a position that will prevent movement of the Bourdon tube 10a in a direction opposite to the desired linear actuating movement of the actuator stem S. As a result, when increased fluid pressure is applied to the Bourdon tube 10 and it tends to circumferentially expand, the fact that the upper turn cannot expand in a direction away from the desired movement of the actuating stem S causes the upper turn of 10a tube to shift its axis in the direction of the desired movement of the actuator stem S. In other words, the pivot post 15a is provided with a linear component of motion in the same direction as the desired response movement of the actuator stem S. The total movement thus imparted to the actuator stem S is the summation of the rotational movement of leaf spring 16a, imparted to the pivot post 15a by the radial contraction of the helical turns 12a, plus the linear shifting of the pivot post 15a due to the restraint imposed by the abutment 60a. Hence, an additional linear displacement of the actuator stem S results. Additionally, the abutment 60a causes the short force output to be that of a Bourdon tube with a number of coils equal to those above the abutment. This is important in operating poppet-type valves by overcoming valve or indicator breakout friction. It also keeps the tube 17 from flexing.

The same increase force effect is produced when the pressure of the fluid pressure source PS exceeds the desired range and causes the expansion movement of the second Bourdon tube 10a to effect the linear shifting of the actuator stem S. However, the linear circumferential expansion does not help shift the actuator stem S. The block 60 simply provides a resisting force to keep the tube from flexing at connection 15. Such a position will decrease the amount of force the tube exerts on the valve stem S. Also, the short stroke force output acting on stem S is equivalent to that of a Bourdon tube with the same number of coils as are above element 60.

Thus, the response of the twin Bourdon tube monitoring unit embodying this invention is sharpened at the high and low ranges of the fluid pressure being monitored due to the restraints imposed by the abutment blocks 60 and 60a.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A Bourdon tube actuator comprising, in combination: a generally cylindrical support post; stationary means for journalling said support post for rotational movement about the longitudinal axis of the support post; a Bourdon tube having an open and a closed end interconnected by helical turns; said support post having a fluid conduit therein; a support pipe connecting said open end of said Bourdon tube to said fluid conduit, thereby supporting said Bourdon tube on said support post, means for connecting said fluid conduit to a fluid pressure source to be monitored, whereby an increase or decrease in pressure of said fluid pressure source causes said Bourdon tube to respectively circumferentially expand or contract; a linearly shiftable valve actuator; means for operatively connecting said closed end of said Bourdon tube to said actuator, whereby circumferential expansion or contraction of said Bourdon tube effects a linear shifting of said actuator; and manually operable means for adjusting the angular position of said support post about its said longitudinal axis to calibrate the response movement of said valve actuator relative to the change in fluid pressure of said fluid pressure source, said means for adjusting the angular position of said support post comprising a collar co-rotatively secured to said support post, said collar having axially spaced flanges respectively defining aligned slots in their periphery, a pin mounted in said slots, said pin having a threaded opening traversing the pin axis intermediate said slots, and an axially fixed, manually rotatable, threaded element cooperating with said threaded opening.

2. A Bourdon tube actuator comprising, in combination: a generally cylindrical support post; stationary means for journalling said support post for rotational movement about the longitudinal axis of the support post; a Bourdon tube having an open and a closed end interconnected by helical turns; said support post having a fluid conduit therein; a support pipe connecting said open end of said Bourdon tube to said fluid conduit, thereby supporting said Bourdon tube on said support post, means for connecting said fluid conduit to a fluid pressure source to be monitored, whereby an increase or decrease in pressure of said fluid pressure source causes said Bourdon tube to respectively circumferentially expand or contract; a linearly shiftable valve actuator; means for operatively connecting said closed end of said Bourdon tube to said actuator, whereby circumferential expansion or contraction of said Bourdon tube effects a linear shifting of said actuator; manually operable means for adjusting the angular position of said support post about its said longitudinal axis to calibrate the response movement of said valve actuator relative to the change in fluid pressure of said fluid pressure source; and an abutment slidably engaging the outer periphery of at least one of the turns of said Bourdon tube adjacent its said closed end, said abutment engagement being located to limit the expansion movement of said Bourdon tube in a direction opposite to the movement of said valve actuator produced by expansion of said Bourdon tube, said means for adjusting the angular position of said support post comprising a collar co-rotatively secured to said support post, said collar having axially spaced flanges respectively defining aligned slots in their periphery, a pin mounted in said slots, said pin having a threaded opening traversing the pin axis intermediate said slots, and an axially fixed, manually rotatable, threaded element cooperating with said threaded opening.

3. An apparatus for monitoring a fluid pressure and effecting the linear movement of an actuator in response to the departure of a fluid pressure above or below a predetermined range comprising, in combination: a first Bourdon tube having an open and a closed end and helical turns intermediate said open and closed ends; a generally cylindrical first support post; a first stationary means for journalling said first support post; said first support post having a first fluid conduit therein; a first support pipe connecting said open end of said first Bourdon tube to said first fluid conduit, thereby supporting said first Bourdon tube on said first support post; means for connecting said first fluid conduit to the fluid pressure source to be monitored, whereby an increase or decrease in pressure of said fluid pressure source causes said first Bourdon tube to respectively circumferentially expand or contract; a second Bourdon tube having an open and a closed end and helical turns intermediate said open and closed ends; a generally cylindrical second support post; stationary second means for journalling said second support post for rotational movement about the longitudinal axis of the second support post and positioning said second support post in parallel relationship to said first support post; said second support post having a second fluid conduit therein; a second support pipe connecting said open end of said second Bourdon tube to said second fluid conduit, thereby supporting said second Bourdon tube on said second support post; means for connecting said second fluid conduit to the fluid pressure source to be monitored, whereby an increase or decrease in pressure of said fluid pressure source causes said second Bourdon tube to respectively circumferentially expand or contract; a linearly shiftable actuator; means for operatively connecting said closed ends to said first and second Bourdon tubes to said actuator, whereby an increase in pressure of the fluid pressure source effects a linear shifting of said actuator in one direction by circumferential expansion of one of said Bourdon tubes and a decrease in pressure of said fluid pressure source causes a linear shifting of said actuator in the same direction by circumferential contraction of the other of said Bourdon tubes; a first manually operable means for adjusting the angular position of said first support post about its longitudinal axis to calibrate the response movement of the actuator relative to an increase in fluid pressure of said fluid pressure source; and a second manually operable means for adjusting the angular position of said second support post about its said longitudinal axis to calibrate the response movement of said actuator relative to a decrease in fluid pressure of said fluid pressure source.

4. The apparatus of claim 3 further comprising a pair of abutments respectively engaging the outer peripheries of at least one of the helical turns of said first and second Bourdon tubes adjacent the closed end of the respective Bourdon tube, said abutment engagements being located to respectively oppose expansion movements of said Bourdon tubes in the direction opposite to the desired linear response movement of said actuator.

5. The apparatus of claim 3 or 4 wherein said first and second Bourdon tubes are respectively disposed on opposite sides of said linearly shiftable actuator; and said means for operatively connecting said closed ends of said first and second Bourdon tubes to said actuator comprises a first radial arm secured to said closed end of said first Bourdon tube; a first pivot post secured to said inner end of said first radial arm and normally lying substantially coaxial with said longitudinal axis of said Bourdon tube; a first radially disposed leaf spring having one end secured to said first pivot post and the other end abutting said linearly shiftable valve actuator; a second radial arm secured to said closed end of said second Bourdon tube; a second pivot post secured to said inner end of said second radial arm and normally lying substantially coaxial with said longitudinal axis of said second Bourdon tube; and a radially disposed second leaf spring having one end secured to said second pivot post and the other end abutting said linearly shiftable valve actuator.

* * * * *